United States Patent [19]
Ito

[11] Patent Number: 5,207,517
[45] Date of Patent: May 4, 1993

[54] METHODS OF COMPRESSION AND EXPANSION OF DOT PATTERN

[75] Inventor: Toshikazu Ito, Tokyo, Japan

[73] Assignee: Oki Electric Industry Co., Ltd., Tokyo, Japan

[21] Appl. No.: 674,511

[22] Filed: Mar. 22, 1991

[30] Foreign Application Priority Data

Mar. 23, 1990 [JP] Japan ................................. 2-72146

[51] Int. Cl.$^5$ ............................................. B44J 2/485
[52] U.S. Cl. .................................... 400/121; 395/110; 395/114; 340/728
[58] Field of Search ................ 400/121; 340/731, 735, 340/728, 790; 395/110, 114, 150, 151, 107; 382/41, 56

[56] References Cited

U.S. PATENT DOCUMENTS

| | | | |
|---|---|---|---|
| 4,632,579 | 12/1986 | Takano et al. | 400/121 |
| 4,741,635 | 5/1988 | Shibata | 400/121 |
| 4,881,069 | 11/1989 | Kameda et al. | 340/735 |
| 4,942,390 | 7/1990 | Do et al. | 340/735 |

FOREIGN PATENT DOCUMENTS

| | | | |
|---|---|---|---|
| 47676 | 3/1982 | Japan | 400/121 |
| 49272 | 3/1982 | Japan | 400/121 |
| 145463 | 8/1983 | Japan | 400/121 |
| 49958 | 3/1985 | Japan | 400/121 |
| 60-78758 | 5/1985 | Japan | |
| 62-30052 | 2/1987 | Japan | |
| 135383 | 6/1987 | Japan | 400/121 |
| 3983 | 1/1988 | Japan | 400/121 |

OTHER PUBLICATIONS

*IBM TDB;* "Compression/Decompression of Font Patterns"; vol. 28, No. 8, pp. 3563-3564; Jan. 1986.

*Primary Examiner*—David A. Wiecking
*Attorney, Agent, or Firm*—Edward D. Manzo; John J. King

[57] ABSTRACT

In a method of compression of a dot pattern which is arranged in such a manner that two or more printing dots are not adjacent in a main scanning direction, the pattern is compressed and stored in a memory, while data read out from the memory is subjected to an expansion processing to obtain the original dot pattern, so that when a printing is performed, dummy printing dots are inserted into rows of the printing dots arranged in the main scanning direction in such a manner that columns of the printing dots arranged in a subscanning direction perpendicular to the main scanning direction. The dot pattern is compressed based on the columns of the printing dots and associated information indicating repetition of the disposition, and then stored in the memory. Further in accordance with the method as stated above, a dot pattern including dummy printing dots is prepared based on the columns of the printing dots which are read out from the memory and arranged in the subscanning direction, and associated information indicating repetition of the disposition of the columns of the printing dots in the main scanning direction. Part of the printing dots is deleted if so arranged that two or more printing dots including the dummy printing dots are adjacent in the main scanning direction, so that the dot pattern is restored in such a manner that two or more printing dots are not adjacent in the main scanning direction.

7 Claims, 9 Drawing Sheets

Fig. 4A

| ROW | NON SHIFT | SHIFT | COLUMN ① (1) | ② (2) | ③ (3) | ④ (5) | ⑤ (11) | ⑥ (12) | ⑦ (13) | ⑧ (15) | (ADDRESS) (STORAGE) |
|---|---|---|---|---|---|---|---|---|---|---|---|
| 1 | (1) | (5) | | | | ▲ | ▲ | ▲ | ● | | — 100 |
| 2 | (3) | (7) | | | | | | | | | |
| 3 | (5) | (9) | | | | | | | ● | | |
| 4 | (7) | (11) | | | | | | | ● | | — 100 |
| 5 | (9) | (13) | | 108 | | | | | ● | | |
| 6 | (11) | (15) | | ▲ | | | | ▲ | ● | | |
| 7 | (13) | (17) | | | | ▲ | | | ● | | |
| 8 | SHIFT DESIGNATION BIT | | 0 | 1 | 0 | 1 | 1 | 1 | 0 | 0 | |

Fig. 4B

| ROW | NON SHIFT | SHIFT | COLUMN ①+K (1) | ②+K (2) | ③+K (3) | ④+K (5) | ⑤+K (11) | ⑥+K (12) | ⑦+K (13) | ⑧+K (15) | (ADDRESS) (STORAGE) |
|---|---|---|---|---|---|---|---|---|---|---|---|
| 1 | (2) | (6) | | | | | | | ● | | |
| 2 | (4) | (8) | | | | | | | | | |
| 3 | (6) | (10) | | | | | | | ● | | — 100 |
| 4 | (8) | (12) | | | | | | | ● | | |
| 5 | (10) | (14) | | | | | | 108 | ▲ | ● | |
| 6 | (12) | (16) | | | | ▲ | | ▲ | ● | | — 100 |
| 7 | (14) | | | | | | | | | | |
| 8 | SHIFT DESIGNATION BIT | | 0 | 0 | 1 | 0 | 1 | 1 | 0 | 0 | |

METHODS OF COMPRESSION AND EXPANSION OF DOT PATTERN

BACKGROUND OF THE INVENTION

1. Field of the Invention

The present invention relates to methods of compression and expansion of a dot pattern consisting of a number of dots arranged in a matrix configuration.

2. Description of the Prior Art

A so-called dot printer such as a wire or stylus type of dot printer or the like is provided with a character generator or memory for storing therein a dot pattern with which a character is represented by a number of dots arranged in a matrix configuration which is of a length of 17 dots and a breadth of 17 dots, and includes in total 289 dots, for example. The dot pattern stored in the memory is represented in such a manner that a dot to be printed is represented by "1" and a dot not to be printed is represented by "0", and the dot pattern is stored based on data in each column. When a printing of a character is performed, a dot pattern is read out from the memory in units of columns to drive printing wires provided on a printing head, so that a desired printing is carried out.

A printing head of the dot printer is generally so arranged that a plurality of printing wires are disposed in a vertical direction. For instance, nine printing wires may be disposed in a vertical direction. In a case where a so-called NLQ character represented by 17 dots×17 dots is printed using such a printing head, the printing head is scanned twice in a main scanning direction or a horizontal direction every printing of one character (one line corresponding). Specifically, length 17 dots are divided into two blocks so as to perform printing of odd rows in a first scanning and printing of even rows in a second scanning.

According to NLQ character, the maximum number of dots on each column of a dot pattern represented by 17 dots×17 dots for characters, symbols and so on is limited within 13 dots. Regarding for instance, English small letter "j", its lowest dots are lowered 4 dots. That is, the lowest dots are located at the 17th row dot position and be treated as a so-called descender letter. Mixing of such a descender letter makes it possible to provide a good balance of a printing result.

It is necessary for the memory to store various dot patterns corresponding to many characters, and thus it is necessary to prepare a large capacity of memory if the amount of data of the individual dot pattern is great. Consequently, there is employed such a method that a dot pattern is subjected to compression processing to store a memory. And when a printing is performed, the dot pattern is subjected to expansion processing to obtain an original dot pattern.

FIG. 3 shows a dot pattern of an ordinary descender letter. The figure is directed to a descender letter of English small letter "j" represented by a dot pattern of 17 dots×17 dots. In the figure, there are arranged printing dots in such a manner that two or more printing dots do not continue in a main scanning direction or a lateral direction. In other words, there is no such an occasion that two or more continuous printing dots, represented in the figure by dark circles, are arranged in an individual row. Hereinafter, it is so defined that in the dot pattern, dots included in an individual row are referred to as a row dot pattern and dots included in an individual column are referred to as a column dot pattern.

The reason why the dot patterns are arranged in such a manner that two or more printing dots are not adjacent in a main scanning direction is that a high speed printing is realized. The detailed reason will be described hereinafter.

When a printing length of wire, or stylus, of a printing head of the wire dot printer is driven, the printing wire protrudes from a home position to print a dot on a printing sheet at a predetermined position and returns to the home position. This operation is repeated. When the same printing wire is continuously driven, the driving is performed after waiting for the printing wire to return to the home position. The reason why this is done is that if a new driving is carried out while the printing wire has not yet returned to the home position, it is impossible to supply a sufficient driving force to the printing wire. That is, there is provided no constant pressing force of the printing wire for pressing a printing sheet. This causes unevenness in density of the printing dots and so on. In order to avoid such a situation, the driving of the printing wire is to be performed in a constant condition.

In a case where a printing is performed, on the other hand, there may exist printing wires which are not driven in printing of a certain column. Such printing wires are ready to immediately operate for printing of the adjacent column. Consequently, there is no need for the waiting for return of the printing wire driven in printing of a certain column to the home position. In other words, it is permitted, while the printing wire driven in a certain column is going to return to the home position, to carry out the printing of the adjacent column. Such a driving of the printing wire may be realized by means of arranging the printing dots in such a manner that two or more printing dots are not adjacent in a main scanning direction. Thus, there is provided the dot pattern as shown in FIG. 3.

Assume, for example, that the printing at column 11, row 16 has been completed. Thus, the printing at column 12 will be performed next. In this case, if it is assumed that there is a dot at column 12, row 16, for example, it is impossible to perform the printing without waiting for return to the home position of the printing wire driven in printing of column 11th. However, it is possible to immediately perform the printing of a dot at column 12, row 14, since there is no printing dot at column 11, row 14.

There are proposed various compression methods of compression of a dot pattern. There is known a method as disclosed in, for example, Japanese Patent Laid-Open Gazette 62-30052/1987, in which information indicating variation of individual column dot patterns is stored. Specifically, only column dot pattern, which is different from that of the adjacent column, is stored in a memory, thereby reducing the amount of data per character.

If such a compression method is applied to the dot pattern as shown in FIG. 3, it would be impossible to expect a sufficient compression and thus to reduce the amount of data. That is, no compression is performed on columns in each of which there exists a printing dot, and compression is performed on only the 14th–17th columns in each of which there exists no printing dot. In effect, there are only 4 columns which are subjected to compression of the column dot data. This is because the dot patterns are arranged in such a manner that two or more printing dots not continue or are not adjacent in a main scanning direction and the column dot patterns in adjacent columns are always different from each other, except when there is no dot pattern in adjacent columns.

As stated above, it is impossible to expect effects of the compression on the dot patterns which are arranged in such a manner that two or more printing dots are not adjacent in a main scanning direction.

SUMMARY OF THE INVENTION

It is therefore an object of the present invention to provide methods of compression and expansion of a dot pattern which make it possible to expect a sufficient effect on even the dot patterns which are arranged in such a manner that two or more printing dots are not adjacent in a main scanning direction.

According to the present invention, there is provided a method of compression of a dot pattern wherein a dot pattern, which is arranged in such a manner that two or more printing dots are not adjacent in a main scanning direction, is compressed and stored in a memory. Data read out from said memory is subjected to expansion processing to obtain an original dot pattern. Printing is performed, comprising the steps of inserting dummy printing dots into rows of the printing dots arranged in the main scanning direction in such a manner that columns of the printing dots arranged in a subscanning direction substantially perpendicular to the main scanning direction are repeatedly disposed, and compressing the dot pattern based on the columns of the printing dots and associated information indicating repetition and storing the compressed dot pattern in said memory.

Further according to the present invention there is provided a method of expansion of a dot pattern wherein a dot pattern, which is arranged in such a manner that two or more printing dots are not adjacent in a main scanning direction, is compressed and stored in a memory, while data read out from said memory is subjected to expansion processing to obtain an original dot pattern, so that a printing is performed, comprising the steps of preparing a dot pattern including dummy printing dots based on the columns of the printing dots, which are read out from said memory means, arranged in a subscanning direction substantially perpendicular to the main scanning direction, and associated information indicating repetition of the disposition of the columns of the printing dots in the main scanning direction, and deleting part of the printing dots if so arranged that two or more printing dots including the dummy printing dots are adjacent in the main scanning direction. As a result the dot pattern is restored in such a manner that two or more printing dots do not continue in the main scanning direction.

BRIEF DESCRIPTION OF THE DRAWINGS

The objects and features of the present invention will become more apparent from the consideration of the following detailed description taken in conjunction with the accompanying drawings in which:

FIGS. 4A and 4B are diagrams used for the explanation of the memory storage according to the present invention;

DESCRIPTION OF THE PREFERRED EMBODIMENTS

Figure 2:
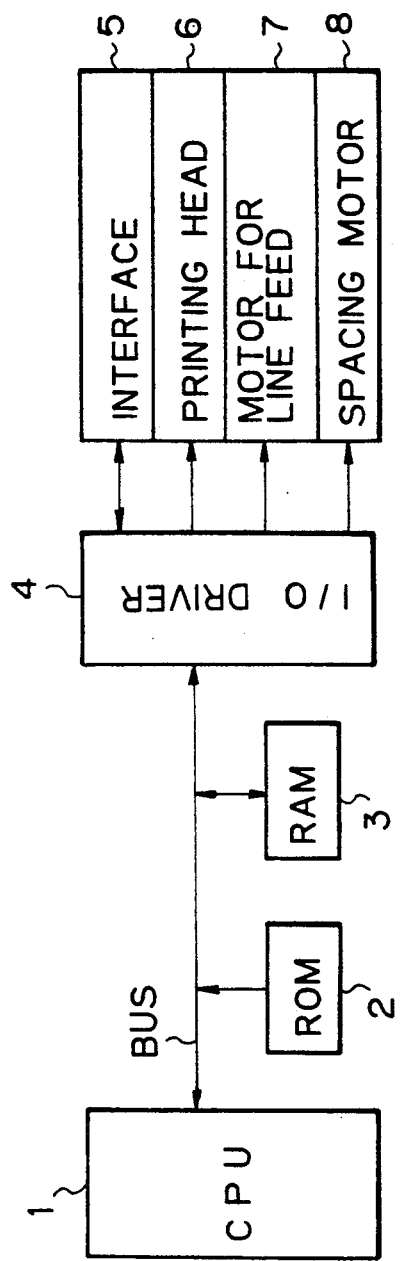
FIG. 2 is a block diagram of a printing apparatus, by way of example, to which methods of compression and expansion of a dot pattern according to the present invention are applicable.

FIG. 2 is a block diagram of a printing apparatus, by way of example, to which methods of compression and expansion of a dot pattern according to the present invention are applicable. As shown in the figure, ROM 2, RAM 3 and I/O driver 4 are connected through a bus line BUS to a processor (CPU) 1. Connected to I/O driver 4 are an interface 5 for controlling communication with an external apparatus, a printing head 6, a line feed motor 7 for feeding a printing sheet, and a spacing motor 8 for use in scanning of the printing head 6. In the printing apparatus as stated above. CPU 1 controls the respective units based on programs and data stored in ROM 2 so as to perform a desired printing triangle.

Figure 1A:
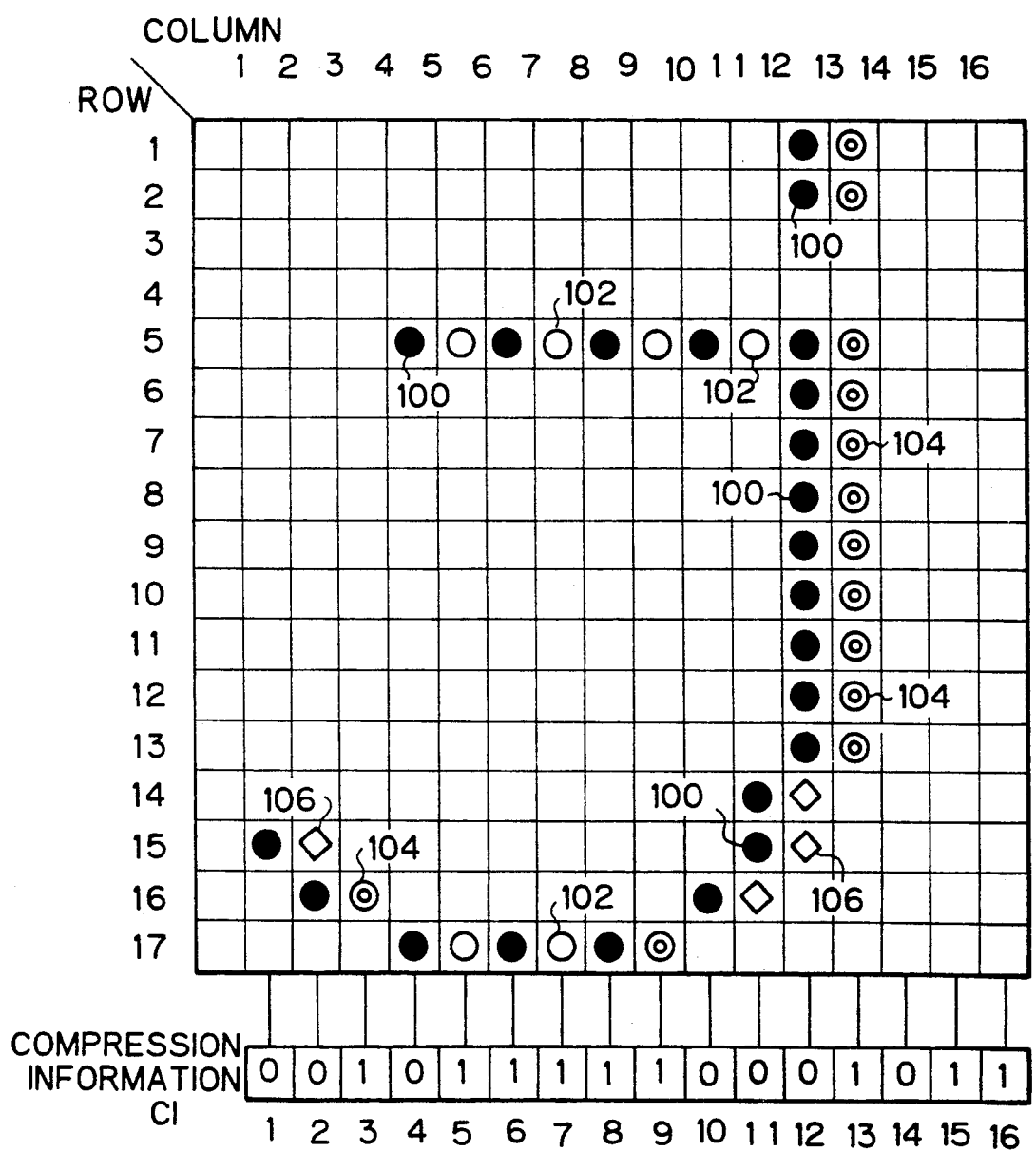
FIGS. 1A and 1B are diagrams used for the explanation of a compression method according to the present invention.
Figure 1B:
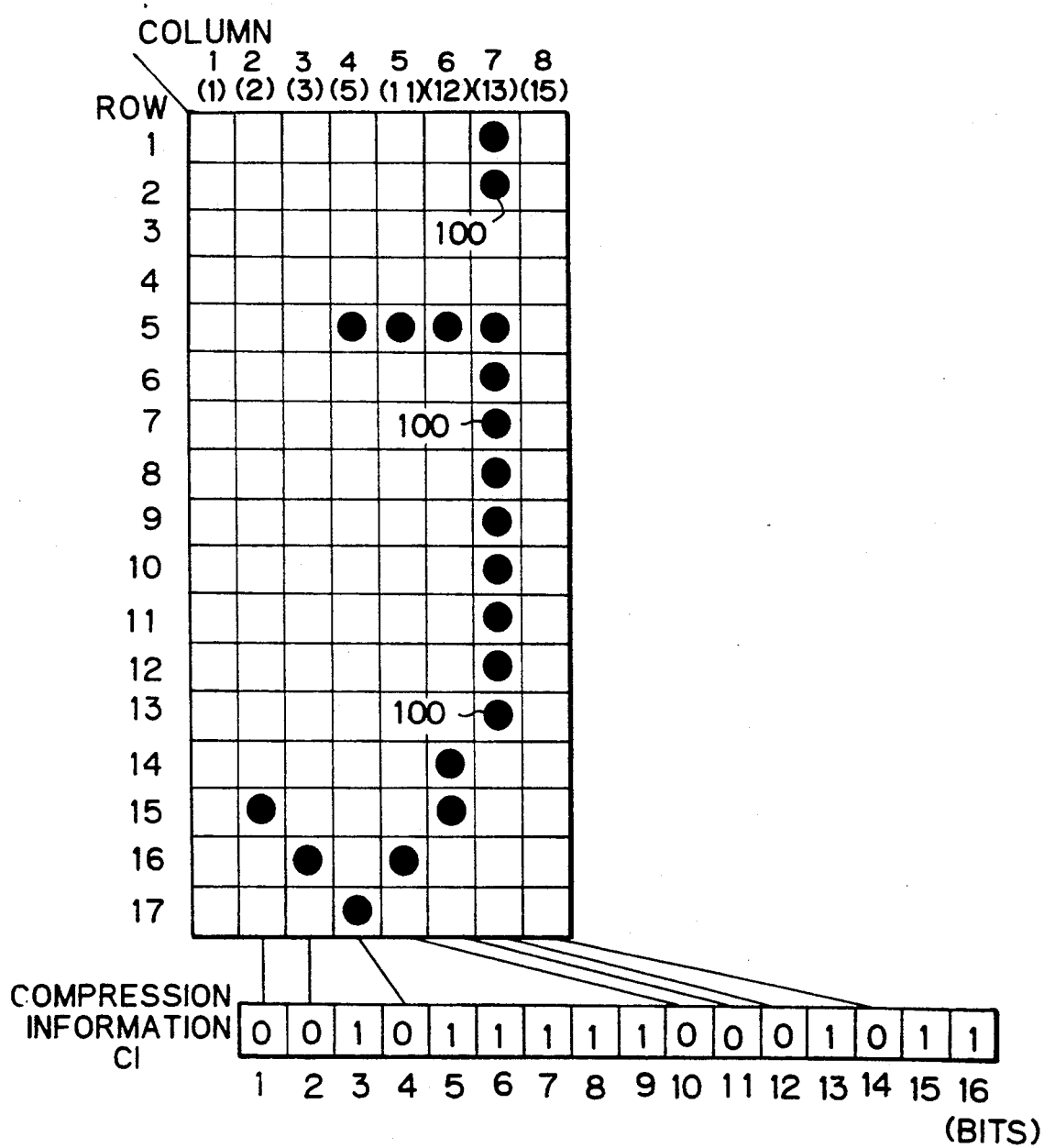
Figure 3:
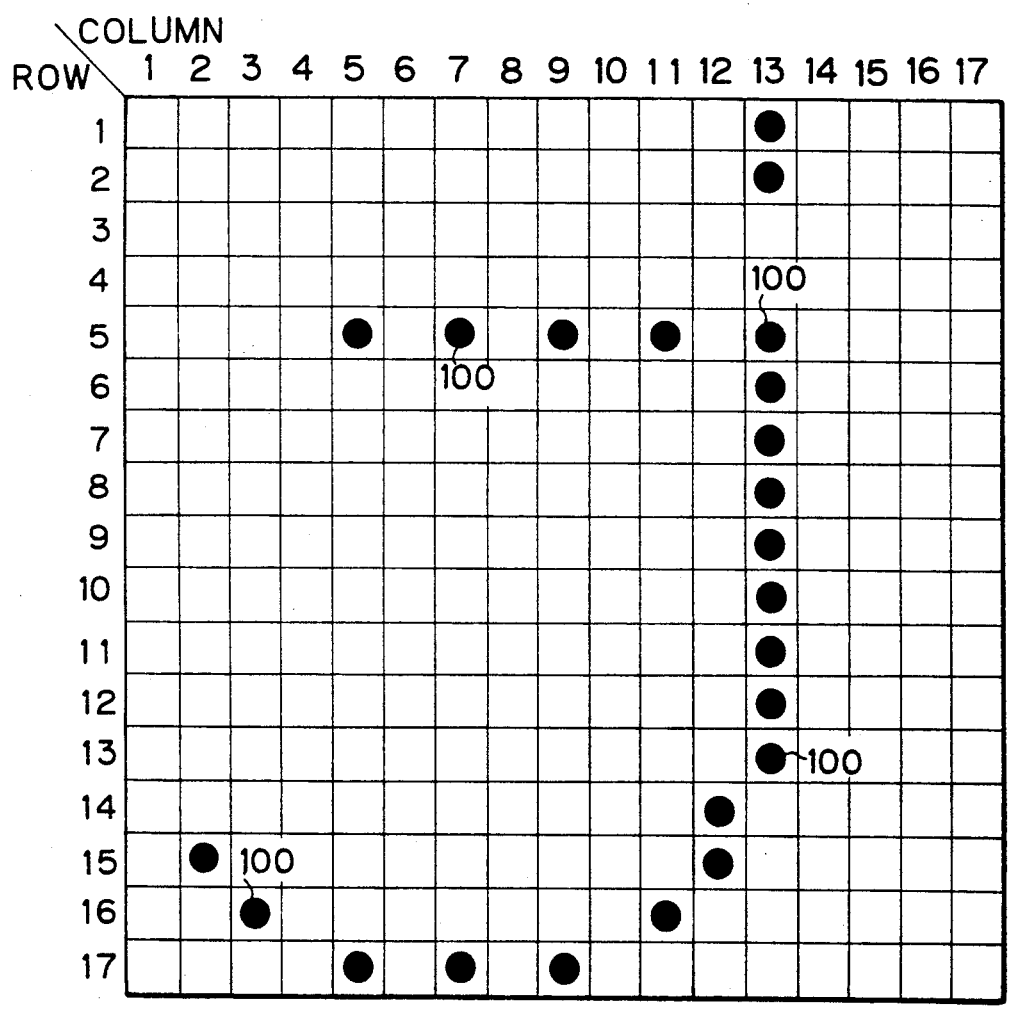
FIG. 3 shows an example of a dot pattern of an ordinary descender letter.

FIGS. 1A and 1B are diagrams used for the explanation of a compression method according to the present invention. Referring to FIG. 1A, there will be explained hereinafter a case of insertion of dummy printing dots. As a dot pattern, English small letter "j" is referred to, by way of example, which has been explained above in conjunction with FIG. 3.

First, taking notice of each of the rows, if there exist in the same row printing dots, represented by dark or solid circles 100, in both an immediately preceding column and an immediately succeeding column with respect to the noticed column, a dummy printing dot, denoted by a white or blank circle 102, is inserted into or added to a position between those printing dots, or the noticed column, which is referred to as the first insertion processing.

Next, in a case where there exist in the same row a printing dot or dark circle 100 in an immediately preceding column with respect to the noticed column, but no printing dot, denoted by a white circle 102, in an immediately succeeding column with respect to the noticed column, a dummy printing dot, which is represented by a doubled circle 104, is inserted or added, for the time being, into a position in the noticed column located immediately after the existing printing dot. And thereafter, comparisons between the columns into each of which the dummy printing dot or doubled circle 104 are inserted and the columns each of which is located immediately before the existing dummy printing dot are sequentially carried out in units of columns from the 1st column to the 17th column. As a result, if there is obtained a coincidence between the associated columns in a dot pattern, the dummy printing dot, marked with a doubled circle 104, which has been inserted for the time being, is retained as the dummy printing dot. On the other hand, if there is obtained no coincidence between the associated columns in a dot pattern, the dummy printing dot 104, which has been inserted for the time being, is withdrawn. That is, there is provided such a status that no dummy printing dot exists, which is called the second insertion processing. Such a status is shown with diamonds in FIG. 1A.

The second insertion processing will be explained more in detail hereinafter, by way of example, referring to the dot patterns of 2nd column to 4th column. First, the dummy printing dots are inserted, for the time being, into the 3rd column, 15th row and the 4th column, 16th row. Next, Comparison of the 2nd column and 3rd column is performed. In this case, a printing dot and a dummy printing dot are not adjacent in 2nd column, 16th row and the 3rd column, 16th row. Thus the dummy printing dot, which has been inserted into 3rd column, 15th row, is withdrawn (shown by the diamonds 106 in FIG. 1A). Comparison of the 3rd column and the 4th column is performed consecutively. In this case, a printing dot and a dummy printing dot in the 3rd column, 16th row and 4th column, 16th row in a dot pattern are adjacent. That is, the printing dot or dark circle 100 and the dummy printing dot or doubled circle 104 in the two columns are in the same location. Consequently, the dummy printing dot 104, which has been inserted into 4rd column, 16th row, is retained.

It is noted that while the second insertion processing is performed after the first insertion processing, a status of a dot pattern in a case where the second insertion processing is performed is a status before the first insertion processing is actually performed, that is, such a status that there is no dummy printing dot or white circle 102 on the dot pattern. In other words, in the first insertion processing, a position into which the dummy printing dot or white circle 102 is to be inserted is simply determined, and after completion of the second insertion processing, the dummy printing dot, designated by a white circle 102, is actually inserted into the determined position in the first insertion processing.

Upon completion of those processing steps, compression information CI is prepared based on individual columns. First 1st column is unconditionally stored in a memory and will not be compressed, and thus the preparation processing for compression information CI is carried out initially from 2nd column. In this preparation, the column of interest is compared with the immediately proceeding column in the dot pattern. If the adjacent columns do not have printing dots and/or dummy dots in the same location, the content of compression information CI is given by "0", and if they do contain the same pattern of printing dots and/or dummy dots, the content of compression information CI is given by "1". The compression information or data CI comprises 16 bits to provide an indication as to whether compression of the individual columns of 2nd to 17th columns has been performed. The compression information CI indicates the number of repeated occurrences in which the printing dot is repeatedly disposed in a main or primary scanning direction. For example, five consecutive contents "1" indicates that the printing dot (the same dot pattern of column) is disposed repeatedly six times, and two consecutive contents "1" indicates that the printing dot (the same dot pattern of column) is disposed repeatedly three times.

The preparation of compression information CI will be explained more in detail hereinafter. As shown in FIG. 1A, matching dot patterns are found in both the 3rd and 4th columns, the 5th to 10th columns, the 13th and 14th columns, and the 15th to 17th columns. Consequently, regarding the respective leading columns of the adjacent groups of columns, that is, the 3rd column, the 5th column, 13th column and the 15th column, since the dot patterns of the columns are stored in a memory, the corresponding contents of compression information CI are given by "0", respectively. In other words, 2nd bit, 4th bit, 12 bit and 14 bit of compression information CI are designated as "0", respectively. On the other hand, regarding the 4th column, 6th to 10th columns, 14th column and 16th to 17th columns, the corresponding contents of compression information CI are designated as "1", respectively. In other words, the 3rd bit, 5th bit to 9th bit, 13 bit, 15 bit and 16 bit of compression information CI are designated as "1", respectively.

Regarding columns on which the same dot pattern does not continue, that is, 2nd column, 11th column and 12th column, the corresponding contents of compression information CI are designated as "0", respectively. In other words, 1st bit, 10th bit and 11 bit of compression information CI are designated as "0", respectively.

Next, compression of the dot pattern will be explained, referring to FIG. 1B. In the figure, a vertical direction designates a row number and a horizontal direction designates a column number wherein the numerals between the parentheses in the horizontal direction designates a column number in FIG. 1A.

FIG. 1B shows a status in which individual columns are compressed based on the above explained compression information CI. There are retained 1st column and only columns on which the corresponding contents of compression information CI are designated as "0", respectively. In other words, compressed or suppressed are columns on which the corresponding contents of compression information CI are designated as "1", respectively. Consequently, as shown in FIG. 1B, there is prepared a dot pattern having a length of 17 dots and a breadth of 8 dots, that is, 17 rows ×8 columns.

To more specifically describe it, first, the 1st column is unconditionally stored in a memory and retained. Next, taking notice of 1st bit of compression information CI corresponding to 2nd column, the corresponding content is given by "0" and 2nd column, FIG. 1B, is retained without compression. Similarly, taking notice of 2nd bit of compression information CI corresponding to 3nd column, the corresponding content is designated as "0" and 3rd column, FIG. 1B, is retained without compression. Further, taking notice of 3rd bit of compression information CI corresponding to 4th column, the corresponding content is designated as "1", that is, 4th column, which has a printing dot adjacent to the third column, is compressed. Hereinafter, on a similar basis, taking notice of 4th bit to 16th bit of compression information CI corresponding to 5th column to 17 column, respectively, the column of interest is retained either to be stored in the memory or it is compressed.

FIGS. 4A and 4B are diagrams used for the explanation of the memory storage according to the present invention. In the figures, the vertical direction designates the bit number of 8 bits, and the horizontal direction designates the address number, wherein the number between parentheses "( )" in the vertical direction designates the row number in case of expansion being performed, and the number between parentheses "( )" in the horizontal direction designates the column number in FIG. 1A, or the column which is stored in the memory without compression. The number in parentheses "( )" in the longitudinal direction shifts in the row number depending on a presence or absence of a shift designation bit, or the situation as to whether or not the shift designation bit has been reset. In FIG. 4A, it is separated into two cases in one of which the 1st row to 13th row are shown, and in another of which 5th row to 17th row are shown. In FIG. 4B, it is separated into two cases in one of which 2nd row to 14th row are shown, and in another of which 6th row to 16th row are shown. In a case where 6th row to 16th row are shown, 7th bit is not used. In other words, there is no such an occasion that data related to the printing dot is stored.

FIGS. 4A and 4B show a status in which a dot pattern is actually stored. In the storage of the dot pattern, to provide a simple driving of the printing head, 17 rows are divided into two groups one of which consists of odd-numbered rows, another of even-numbered rows. In the processing, the individual odd-numbered rows and the individual even-numbered rows may be represented by 8 bits, respectively, as disclosed in Japanese Patent-Laid Open Gazette 78758/1985, for example.

According to such a manner, one bit of 8 bits is used for a shift designation bit, and the remaining 7 bits are used for representation of a dot pattern. For example, in case of a dot pattern corresponding to the odd-numbered rows shown on FIG. 4A, if the shift designation bit is reset (content 0), printing dots marked by the dark circles 100 on 1st row, 3rd row, ... 13th row are represented, on the other hand, if the shift designation bit is set (content 1), printing dots, designated by the dark triangles 108, on 5th row, 7th row, ... 17th row are represented. That is, in a case where the shift designation bit is set, a dot pattern of 7 bits is shifted by 2 bits. Also regarding a dot pattern of the even-numbered rows shown in FIG. 4B, the same method is employed.

Specifically, by way of example, such a case that a printing head provided with 9 printing wires is driven, data of 7th bit of the dot pattern of 7 bits is utilized for driving of 7th printing wire, if the shift designation bit has been reset. On the other hand, if the shift designation bit has been set, data of 7th bit of the dot pattern of 7 bits is utilized for driving of 9th printing wire. Thus, suitable selection of the content of the shift designation bit makes it possible to readily perform driving of 9 printing wires or stylus. Further, it is possible to perform storage of the dot pattern into the memory in units of bytes which permit data to be readily treated.

Individual columns of information, each consisting of 8 bits, are stored in units of bytes in addresses [1] to [8], on odd-numbered rows, and in addresses [1]+k to [8]+k, on even-numbered rows, where k is a constant. In the figures, those addresses are represented by numbers encircled. For instance, in a case where a group of dot patterns of odd-numbered rows and a group of dot patterns of even-numbered rows are consecutively stored, if the dot patterns of odd-numbered rows are stored in addresses 1000 to 1999, then k equals 1000. Thus, storage of the dot patterns of even-numbered rows is initiated from address 2000.

Compression information CI is preserved in a table. In order to obtain a position on a memory in which a dot pattern corresponding to a desired character is stored, a pair relation with a memory address is provided for each character. A method of compression of the present invention is effected in accordance with the procedure as explained above.

Next, a method of expansion of the present invention will be explained. In a processing for expansion, because of limitation on driving of a printing head, an expansion of dot patterns on the odd-numbered rows as explained in FIG. 4A and printing are carried out first, and thereafter an expansion of dot patterns on the even-numbered rows and printing are carried out.

Figure 5A:
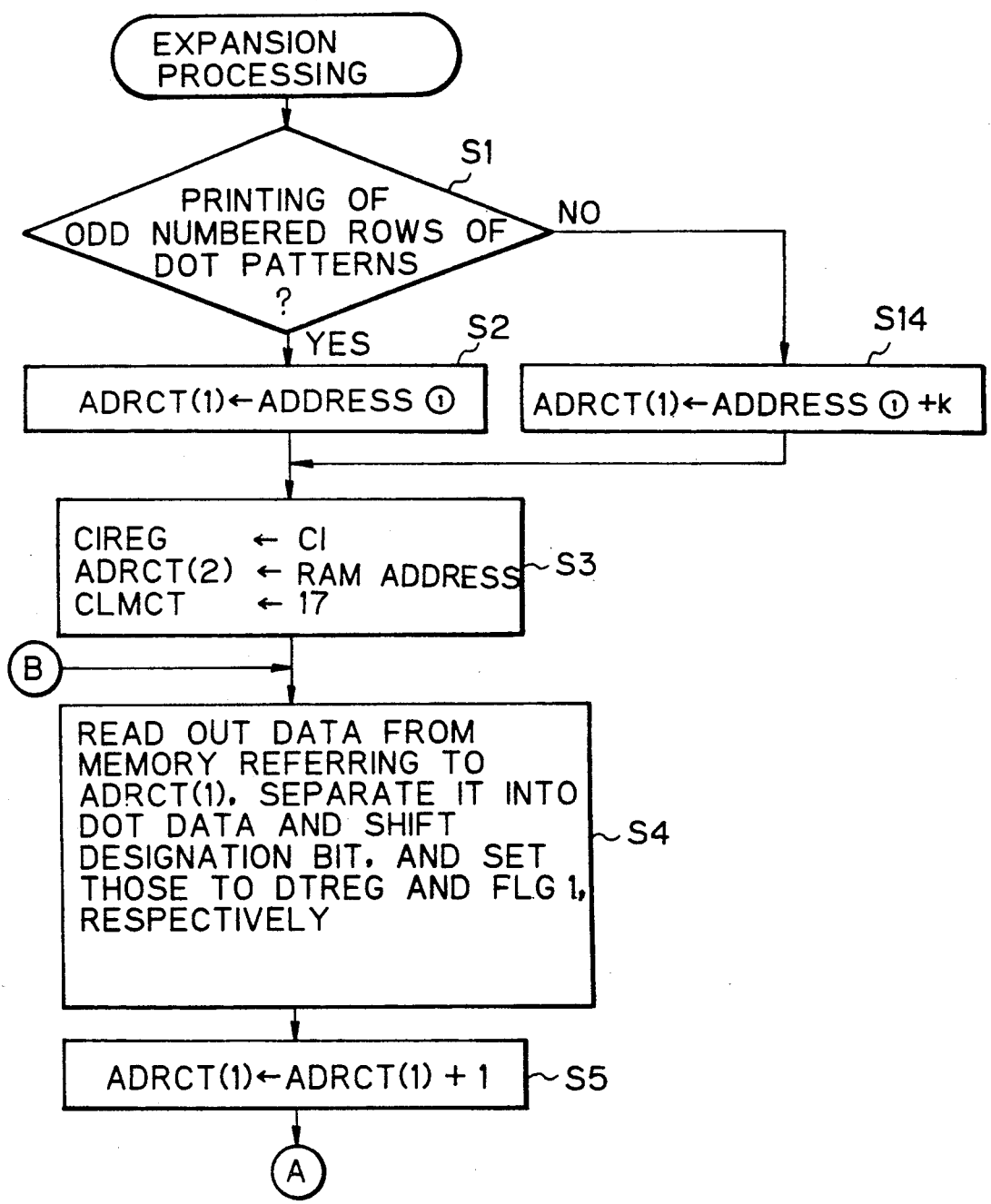
FIGS. 5A and 5B are flow charts related to a method of expansion according to the present invention.
Figure 5B:
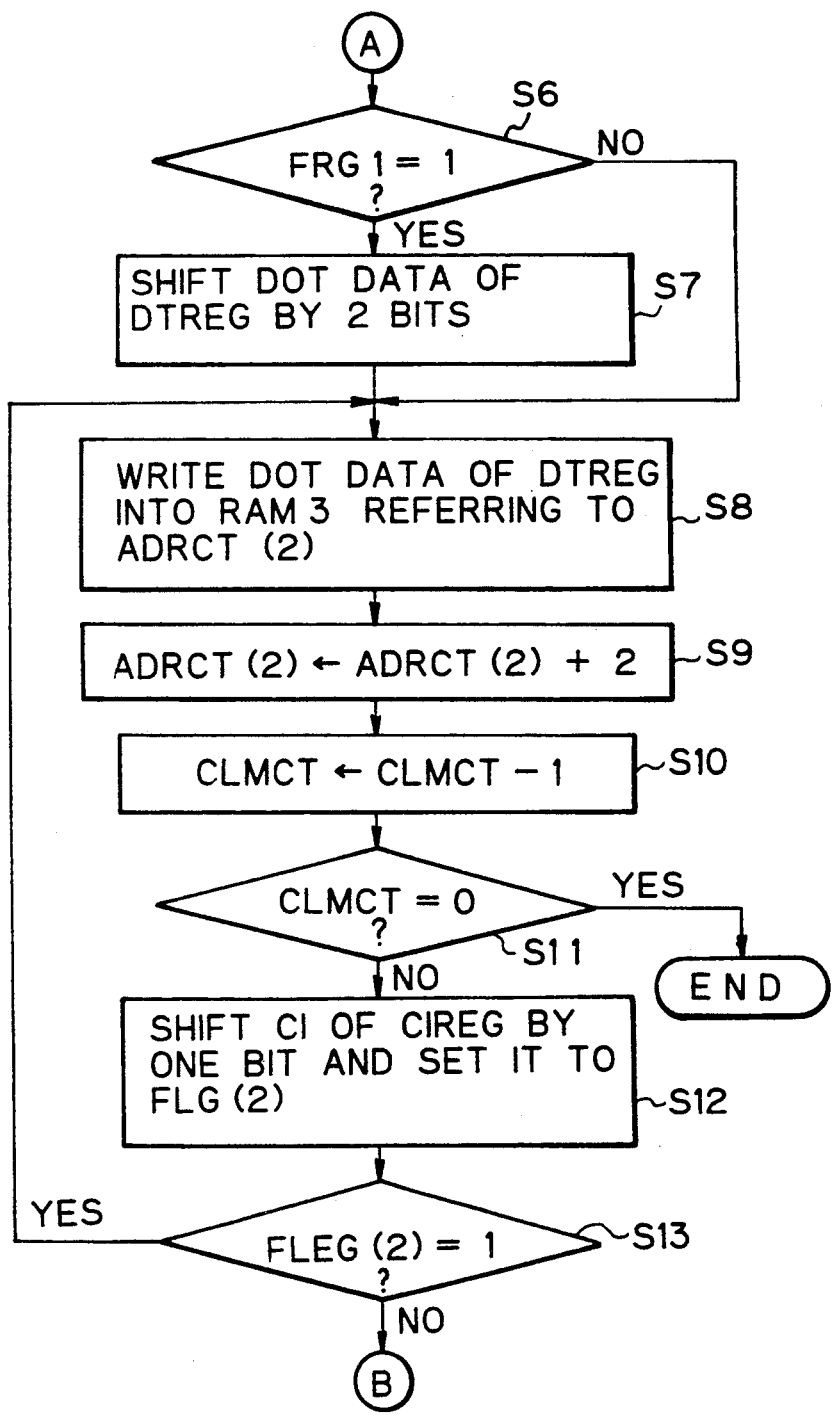
Figure 6:
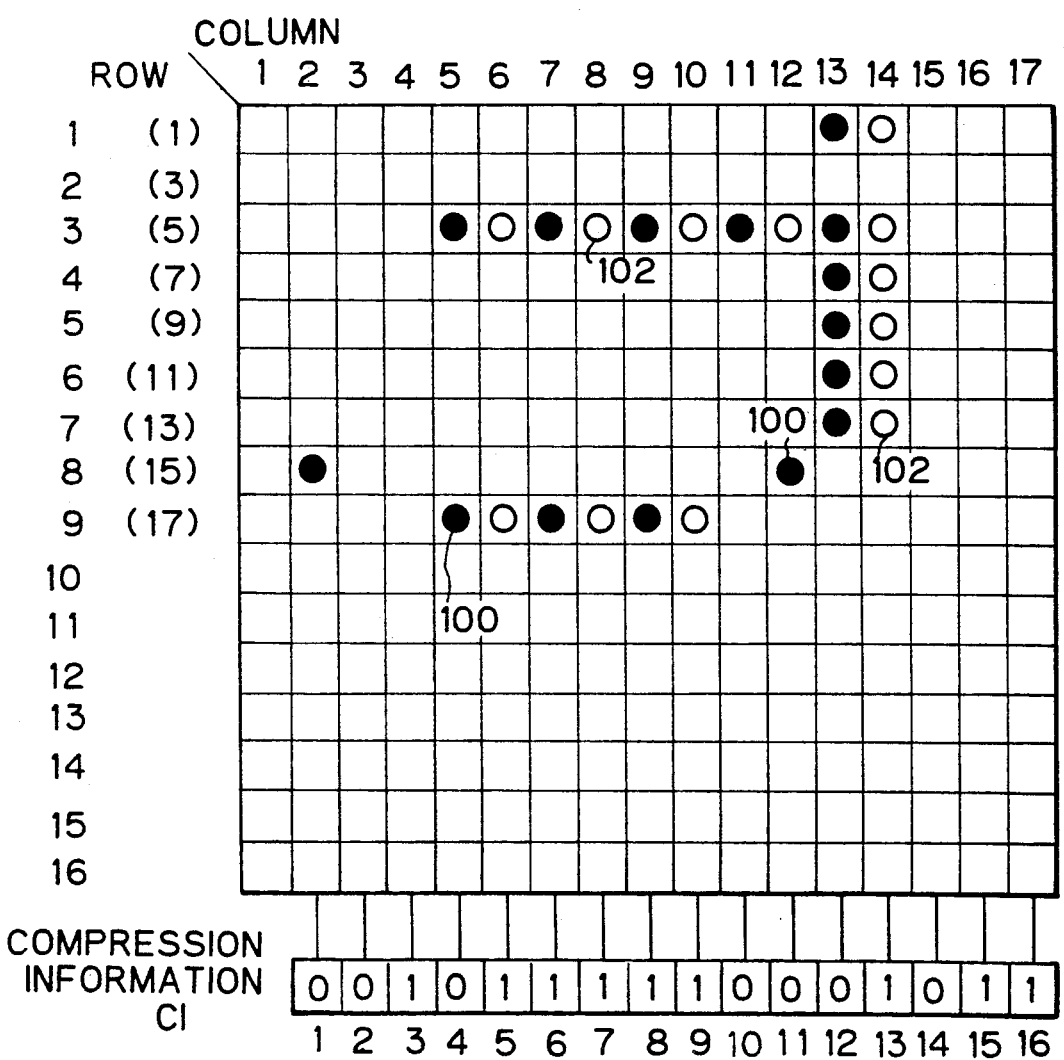
FIG. 6 is a diagram used for the explanation of expansion according to the present invention.

Explained hereinafter would be, by way of example, a case of expansion of dot patterns on the odd-numbered rows, referring to FIGS. 5A and 5B, 6 and 7. FIGS. 5A and 5B are flow charts related to a method of expansion according to the present invention. FIG. 6 is a diagram used for the explanation of expansion according to the present invention.

Described hereinafter would be, by way of example, such a case that data each consisting of 8 bits, 8 rows, which are explained with reference to FIG. 4A, are sequentially read out and expanded.

In explanation of FIGS. 5A and 5B, it is assumed that various counters and flags are provided in RAM 3 of FIG. 2. First, it is determined as to whether a dot pattern to be printed (expanded) is a dot pattern on the odd-numbered row (step 1). If a result is "yes", the procedure goes to step 2 in which an address counter ADRCT (1) is set with address [1], FIG. 4A. The address [1] is an address of a memory, or a first address of a memory area in which a dot pattern of a desired character to be read out is stored. In step 3, a compression information register CIREG stores compression information CI, an address counter ADRCT (2) stores a predetermined address, or a first address of a memory area on RAM 3 in which an expanded dot pattern is stored, and column counter CLMCT is set to "17". The column counter CLMCT determines as to whether a character of expansion processing has been completed, and is set with "17", since a final column is the 17th column in this example.

Next, in step 4, referring to the address counter ADRCT (1), a byte of data is read out from a memory to perform a separation of a dot pattern (7 bits) and a shift designation bit (1 bit), and upon adding 9th bit of the content "0" to the lower bit of the dot pattern, the dot pattern is stored in a data register DTREG, while the content of the shift designation bit is set to a flag FLG (1). In step 5, the content of the address counter ADRCT (1) is increased.

In step 6, it is determined as to whether the content of the flag FLG (1) is "1". If a result is "yes", the procedure goes to step 7 in which the content of the data register DTREG is shifted by 2 bits. And referring to the address counter ADRCT (2), the content of the data register DTREG is written in RAM 3 (step 8). In step 9, the content of the address counter ADRCT (2) is renewed (number "2" is added because storage is performed bridging 2 addresses).

In step 10, the content of the column counter CLMCT is decreased, and in step 11 it is determined as to whether the content of the column counter CLMCT is "0". If a result is "yes", the processing involved in the dot patterns on the odd-numbered rows is terminated.

Meanwhile, if the result is "no", the procedure goes to step 12 in which the content of the compression information register CIREG is shifted by one bit and then be set to a flag FLG (2). In step 13, it is determined as to whether the content of the flag FLG (2) is "1". If a result is "yes", the procedure goes back to step 8 to perform preparation of a row of the same dot pattern. On the other hand, if the result is "no", the procedure goes back to step 4 to perform reading out of new data.

If the result of step 1 is "no", the procedure goes to step 14 in which an address counter ADRCT (1) is set with address [1]+k (FIG. 4B), and then goes to step 3.

Such a processing as stated above is continued until the content of the column counter CLMCT becomes "0", so that the dot pattern as shown in FIG. 6 is printed.

While the individual column consists of 16 dots, the actual dots to be supplied to the printing head are the upper 9 dots. That is, uppermost dot is utilized for driving of 1st printing wire to perform a printing of 1st row, the next dot is utilized for driving of 2nd printing wire or stylus to perform a printing of 3rd row etc. Thus, 9th dot is utilized for driving of 9th printing wire to perform a printing of 17th row.

In the dot pattern shown in FIG. 6, there are printing dots marked with dark circles 100 and the dummy printing dots designated by white or blank circles 102. Thus, it is necessary to perform processing in which the dummy printing dots or white circles 102 are deleted.

Figure 7:
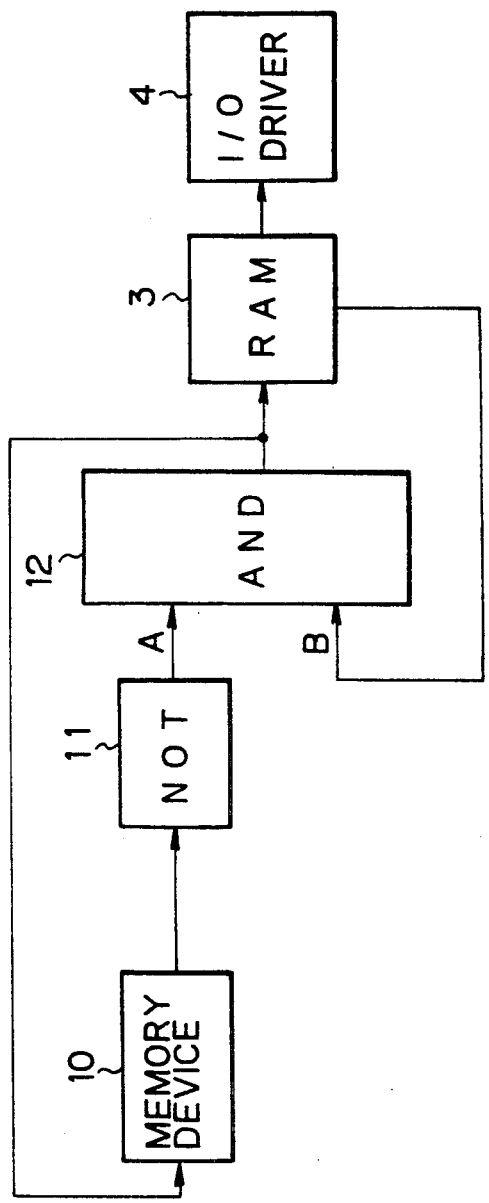
FIG. 7 is a block diagram related to a method of expansion according to the present invention.

Now, referring to FIG. 7, processing for deletion of the dummy printing dots will be explained. FIG. 7 is a block diagram related to a method of expansion according to the present invention. In the figure, storage device 10, NOT gate or inverter 11 and AND gate 12, as well as RAM 3 and I/O driver 4 as explained with reference to FIG. 2 are all shown. The storage device 10, NOT gate 11 and AND gate 12 may be realized by an internal register of CPU 1, or execution of a program sequence stored in ROM 2 by CPU 1 itself.

An output of the storage device 10 is connected to the NOT gate 11, and an output of the NOT gate 11 is connected to an input A of the AND gate 12. An output of the AND gate 12 is connected to inputs of RAM 3 and the storage device 10. An output of the RAM 3 is connected to an input B of the AND gate 12 and the I/O driver 4.

Assume that all of the signals which are transmitted through the respective circuits and the devices of the structure as mentioned above are given in units of 9 bits. Consequently, the storage device 10 is provided with a storage capacity of 9 bit unit, and the NOT gate 11 and the AND gate 12 perform logical operations of NAND/NOR and AND, respectively.

Initially, all the contents of the storage device 10 have been set to "0". Data of the upper 9 dots on 1st column shown in FIG. 6 is read out from RAM 3, and is entered to the input B of AND gate 12. Data of 9 bits all designated as "1" after being inverted in NOT gate 11 are entered to the input A of AND gate 12, and thus the same data as entered to the input B is delivered from the output of AND gate 12. The data from the output of AND gate 12 is stored in the storage device 10 as well as an area on RAM 3 from which the previous 9 bits of data were read out.

In the similar manner, when data of the upper 9 dots on 2nd column shown in FIG. 6 is read out from RAM 3, data designated as "1" on 8th dot is delivered from the output of AND gate 12. The data from the output of AND gate 12 is stored in the storage device 10 as well as RAM 3.

Next, when data of the upper 9 dots on the 3rd column shown in FIG. 6 is read out from RAM 3, data designated as "0" of 9 dots is entered to the input B of AND gate 12. Data of the content "0" on the 8th dot is entered to the input A of AND gate 12, and thus the data designated as "0" of 9 bits is delivered from the output of AND gate 12. The data from the output of AND gate 12 is stored in the storage device 10 as well as RAM 3.

The fourth column shown in FIG. 6 is also subjected to the similar processing to that as stated on 3rd column, and thus the data designated as "0" of 9 bits is delivered from the output of AND gate 12. The data from the output of AND gate 12 is stored in the storage device 10 as well as RAM 3.

When data on the 5th column shown in FIG. 6 is read out from RAM 3, data designated as "1" on 3rd and 9th dots is delivered from the output of AND gate 12. And when data on 6th column shown in FIG. 6 is read out from RAM 3, data designated as "1" on the 3rd and 9th dots is entered to the input B of AND gate 12. However, data designated as "0" on 3rd and 9th dot is delivered from the output of NOT gate 11 and be entered to the input A of AND gate 12, and thus the data designated as "0" of 9 bits is delivered from the output of AND gate 12. Thus, the dummy printing dot, marked a blank circle 102, on 6th column has been deleted. Similarly, the dummy printing dots or white circles 102 on the 8th, 10th, 12th and 14th columns are also deleted.

When the processing as stated above is completed up to 17th column, the expansion processing is completely terminated, and thereafter the dot pattern is transferred from RAM 3 to I/O driver 4, so that a predetermined printing is performed.

In a case where for example, 215 sets of dot patterns designated by ASCII codes, or 215 characters, are stored in a memory by applying any methods of compression and expansion of the dot patterns, (for example, such a conventional compression method that one character or set is compressed to data of 17 columns of 16 bits (i.e. 272 bits) upon simply providing a shift designation bit then a storage capacity of 7310 (215×272) bytes is needed. On the other hand, if applying the methods of compression and expansion of a dot pattern according to the present invention as stated above, it is possible to compress 1082 columns to 215 sets of dot patterns. If this is expressed by the amount of data, it may be given by the equivalence "1082×16 bits=3604 bytes" (including the shift designation bit). Additional amount of data as information for indicating memory addresses to indicate the storage locations for the compression information CI. Specifically 215 sets of dot patterns needs 4 bytes for each set (one character) of dot pattern, and thus in total 860 (215×4) bytes. Therefore, a compression ratio in case of application of the present invention is given by the following equation:

$$(7310 - 3604 + 860)/7310 \times 100\% \approx 63\%.$$

Thus, the present invention requires about 63% of storage capacity of a memory compared to a conventional one.

According to the methods of compression and expansion of a dot pattern according to the present invention as stated above, there is provided such a situation that dummy printing dots are added to form the consecutive printing dots, even in the dot patterns which are arranged in such a manner that two or more printing dots are not adjacent in a main scanning direction, and thus it is possible to easily improve the effect of the compression. Further, also in the expansion, it is possible to easily delete the dummy printing dots.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. A method of compressing a dot pattern having no two printing dots adjacent to each other in a main scanning direction and storing data representative of the dot pattern in compressed form in a memory, from which the data can be subsequently read out in expansion processing to obtain the original dot pattern for use in printing, comprising the steps of:

inserting dummy printing dots into positions within rows of the dot pattern so that each dummy printing dot immediately precedes and immediately follows original printing dots, wherein columns of dot positions are arranged in a subscanning direction substantially perpendicular to the main scanning direction;

for each printing dot, inserting a respective provisional dummy printing dot provided that the next row position following the provisional dummy printing dot does not contain a printing dot;

comparing a first column with a second column that immediately precedes the first column to determine whether the respective dot pattern of the first column being compared is identical to the original dot pattern in the second column and keeping the provisional dummy printing dots in the column when the dot patterns coincide and removing selected ones of the provisional dummy printing dots in the first column when the dot patterns do not coincide; and compressing the dot pattern based on the comparison of the columns of the printing dots and associated information indicating repetition of columns; and storing the compressed dot pattern in said memory.

2. A method of compression of a dot pattern according to claim 1 wherein the dot pattern provides for 17 dots in a column and 17 dots in a row arranged in a matrix configuration to represent characters.

3. A method of compression of the dot pattern according to claim 2 wherein the compressed dot pattern is represented by 8 dots in a column and 17 dots in a row arranged in a matrix configuration.

4. A method of compression of a dot pattern according to claim 3 wherein the 17 rows are divided into two groups, one of which consists of odd-numbered rows, another of even-numbered rows.

5. A method of expansion of a dot pattern wherein a dot pattern, having no two printing dots adjacent to each other in a main scanning direction and being compressed and stored in a memory, is data read out from said memory and expanded to obtain an original dot pattern for use in printing, comprising the steps of:

preparing a dot pattern including dummy printing dots based on (i) the positions of printing dots within columns of printing dots which are read out from said memory and arranged in a subscanning direction substantially perpendicular to the main scanning direction, and (ii) associated information indicating whether each column of printing dots coincides with the adjacent preceding column of printing dots in the main scanning direction; and deleting selected dummy printing dots if two or more printing dots including the dummy printing dots are adjacent in the main scanning direction, so that the dot pattern is restored in such a manner that two or more printing dots in the dot pattern are not adjacent in the main scanning direction.

6. A method of expansion of a dot pattern according to claim 5, wherein said part of the printing dots includes the dummy printing dots, and deletion of the dummy printing dots is performed by logical operation in units of 9 bits.

7. A method of comparing compressed information of a dot pattern which is subjected to an expansion processing to obtain an original dot pattern for use in printing, comprising the steps of:

preparing a letter font represented by a dot pattern which is arranged in such a manner that two or more printing dots are not adjacent in a main scanning direction;

provisionally inserting dummy printing dots in the row positions immediately following the printing dots;

retaining said inserted dummy printing dots which immediately precede and immediately follow original printing dots within rows;

comparing a first column with an immediately preceding second column disposed in a subscanning direction having said inserted dummy printing dots to determine whether said respective printing dot pattern in the first column including dummy printing dots coincides with the original printing dots in the second column and to delete remaining ones of said dummy printing dots in the first column which do not result in a column which is identical to the second column; and setting an indication as compressed information for columns disposed in the subscanning direction when the contents of the first column coincides with the contents of the second column and when the contents of the first column does not coincide with the contents of the second column.

* * * * *